US009347678B2

(12) United States Patent
Stakutis et al.

(10) Patent No.: US 9,347,678 B2
(45) Date of Patent: May 24, 2016

(54) DISTRIBUTED INDOOR AIR QUALITY CONTROL MODULE AND METHOD

(75) Inventors: Richard Edward Stakutis, Sudbury, MA (US); Kenneth William Crooks, Groton, MA (US)

(73) Assignee: Honeywell International Inc., Morris Plains, NJ (US)

( * ) Notice: Subject to any disclaimer, the term of this patent is extended or adjusted under 35 U.S.C. 154(b) by 456 days.

(21) Appl. No.: 13/434,790

(22) Filed: Mar. 29, 2012

(65) Prior Publication Data
US 2013/0260668 A1    Oct. 3, 2013

(51) Int. Cl.
F24F 7/007    (2006.01)
F24F 11/00    (2006.01)

(52) U.S. Cl.
CPC ......... F24F 11/0001 (2013.01); F24F 11/0017 (2013.01); F24F 2011/0026 (2013.01); F24F 2011/0027 (2013.01); F24F 2011/0032 (2013.01); Y02B 30/78 (2013.01)

(58) Field of Classification Search
CPC . F24F 11/0001; F24F 11/001; F24F 11/0017; F24F 2011/0026; F24F 2011/0027; F24F 2011/0032; Y02B 30/78
USPC ................ 454/239, 256, 187, 229; 73/863.86
See application file for complete search history.

(56) References Cited

U.S. PATENT DOCUMENTS 4,759,196 A * 7/1988 Davis .............................. 62/326
5,292,280 A   3/1994 Janu et al.
5,751,572 A * 5/1998 Maciulewicz .................... 700/3
6,790,136 B2  9/2004 Sharp et al.
7,000,480 B2  2/2006 Kramer
7,389,158 B2 * 6/2008 Desrochers et al. .......... 700/277
2006/0060005 A1* 3/2006 Desrochers et al. ....... 73/863.86
2006/0150644 A1  7/2006 Wruck
2006/0234621 A1 10/2006 Desrochers et al.
2007/0082601 A1* 4/2007 Desrochers et al. .......... 454/256
2007/0267508 A1 11/2007 Hoglund et al.
2008/0014857 A1  1/2008 Spadafora et al.
2011/0065097 A1* 3/2011 Jones, Jr. .......................... 435/5
2011/0264280 A1 10/2011 Grabinger et al.

OTHER PUBLICATIONS

AirAdvice, "How BuildingAdvice Works," BuildingAdvice Elite, 2 pages, Printed May 16, 2012. http://www.airadvice.com/products/buildingadvice/elite/how.
Aircuity, "Aircuity OptiNet Multipoint Sampling System," 1 page, Printed May 16, 2012. http://www.aircuity.com/technology/optinet-overview/.

(Continued)

Primary Examiner — Gregory Huson
Assistant Examiner — Dana Tighe
(74) Attorney, Agent, or Firm — Seager, Tufte & Wickhem, LLP

(57) ABSTRACT

An indoor air quality (IAQ) control module may be provided for sensing and controlling the indoor environmental quality (IEQ) of a zone in a building. The IAQ control module may receive a supply air sample from a supply vent and a return air sample from a return vent, where the air samples are taken using the pressure created by a blower within the HVAC system. The IAQ control module may then compute a differential value for each of the sensed one or more air parameters and generate a control signal or command based on at least the differential value(s). The IAQ control module may then communicate the control signal to an airflow control device to control the airflow to and/or from the zone.

19 Claims, 3 Drawing Sheets

(56) References Cited

OTHER PUBLICATIONS

Aircuity, "OptiNet Components Evaluate Indoor Environmental Quality," 2 pages, Printed May 15, 2012. http://www.aircuity.com/technology/optinet-components/.

Aircuity, "OptiNet Collects Indoor Environmental Data for Real-Time Monitoring", 1 page, Printed May 16, 2012. http://www.aircuity.com/technology/optinet-operation/.

Aircuity, "OptiNet Applications Improve Indoor Environmental Quality", 1 page, Printed May 16, 2012. http://www.aircuity.com/technology/optinnet-applications/.

Pheonix Controls, "Programmable Control Module: LonMark", Revision Aug. 2011, 10 pages, 2009. MKT-0244 MPC-1647.

Pheonix Controls, "Theris Family of Valves: LonMark Certified", Theris®, Revision May 2011, 18 pages, 2009. MKT-0118 MPC-1572.

Pheonix Controls, "Traccel Family of Valves:BACnet® MS/TP", Traccel®, Revision Sep. 2011, 29 pages, 2009. MKT-0242 MPC-1661.

International Search Report for Corresponding Application No. PCT/US2013/030652, dated Jun. 4, 2013.

* cited by examiner

US 9,347,678 B2

DISTRIBUTED INDOOR AIR QUALITY CONTROL MODULE AND METHOD

TECHNICAL FIELD

This disclosure relates generally to HVAC systems, and more particularly, to systems and methods for controlling the indoor air quality of a zone in a building.

BACKGROUND

HVAC systems are commonly used to control various environmental conditions within building structures including, for example, temperature, humidity, ventilation and the like. In doing so, a blower or fan is typically used to circulate the air within the building by forcing air through the HVAC system. Some HVAC systems have one or more circulation modes. For example, some HVAC systems have a fan "on" mode, where the fan is "on" continuously, regardless of whether the HVAC system is called to heat or cool the air in the building structure. A "circulate" fan mode is also sometimes provided, which typically runs the fan for a fixed period of time during each hour, such as 20 minutes each hour. These and other circulation modes may help circulate the air within the building.

In some HVAC systems, fresh air ventilation may also be provided. Fresh air ventilation has become increasingly popular, especially since new building structures have become more energy efficient and consequently more air tight. Fresh air ventilation is used to replace stale or contaminated air inside the building structure with fresh outside air. Heat exchangers are sometimes used to exchange heat between the outgoing stale or contaminated air and the incoming fresh outside air to help improve efficiency and reduce energy costs. In some cases, a certain level of fresh ventilation is provided regardless of the actual air quality in the building. For example, in some cases, fresh air ventilation is scheduled and performed for 20 minutes of every hour. However, such ventilation schedules can result in over-ventilation of a zone when a zone is unoccupied, and under-ventilation when a zone is occupied. Over-ventilation can unduly increase energy costs while under-ventilation can reduce air quality in the building.

To help improve fresh air ventilation, some HVAC systems include one or more air quality sensors to sense the air quality in the building. Fresh air is then provided when the sensed air quality falls below a minimum air quality threshold. For example, when the air quality sensor is a carbon dioxide sensor, fresh air may be provided to a zone when the sensed carbon dioxide concentration rises above a carbon dioxide threshold.

In some cases, use of multiple discrete air quality sensors spread across the various zones of a building may not allow building owners to optimize energy savings and/or air quality because of sensor drift and other sensor inaccuracies. Compounded drift and accuracy differences can lead to unwanted under ventilation and/or over ventilation in a building. Centralized sensor systems have also been developed to use a single set of air quality sensor, with all of the air quality sensors located at a central location in the building. In such systems, a vacuum pump or the like, and a relatively complex flow metering system including tubes strung between the centralized sensor system and each of the zones, are often used to transfer air samples from the each of the monitored zones to the centrally located sensor set. Such systems, however, can be expensive, complex, less reliable, difficult to install and not easily integrated with existing HVAC systems.

SUMMARY

This disclosure relates generally to HVAC systems, and more particularly, to systems and methods for controlling the indoor air quality of a zone in a building. In one illustrative embodiment, a distributed indoor air quality (IAQ) control module is provided that has one or more air quality sensors. The air quality sensors may each be configured to operate as a differential sensor, sensing the difference in a particular air parameter value in a stream of fresh incoming air versus a stream of stale or contaminated outgoing air. Such a differential measurement may reduce the effects of sensor drift and other inaccuracies of the sensors. In some cases, the distributed indoor air quality (IAQ) control module may be co-located with a zone damper controller, and may provide commands to the zone damper controller to open a fresh air damper and a return air damper in a manner that achieves a desired air quality in the corresponding zone.

In one illustrative embodiment, and to obtain the air samples, the indoor air quality (IAQ) control module may include a first pressure tap for receiving a supply air sample from a supply air duct of a corresponding zone using the pressure created by the blower or fan of the HVAC system itself. Similarly, the indoor air quality (IAQ) control module may include a second pressure tap for receiving a return air sample from the return air duct of the corresponding zone using the velocity pressure of the air drawn from the zone by the blower or fan of the HVAC system. In some cases, the indoor air quality (IAQ) control module may be additionally configured with a third pressure tap to sample air directly from the zone using a pressure differential between the supply air duct and/or the zone and the return air duct. In some cases, one or more valves (e.g., a 3-way solenoid valve, a 4-way solenoid valve, two or more 2-way solenoid valves, etc.) may be used to sequentially allow the supply air sample to pass by the one or more sensors, and then to allow the return air sample to pass by the one or more sensors.

As the supply air sample passes by the one or more sensors, the indoor air quality (IAQ) control module may sense at least one air parameters and then store the at least one sensed air parameter values in a memory. Then, the indoor air quality (IAQ) control module may switch the position of the valve to allow the return air sample to pass by the one or more sensors. Then, the indoor air quality (IAQ) control module may sense the same at least one air parameters and store the at least one sensed air parameter values in the memory. A processor or the like within the indoor air quality (IAQ) control module may then compare (e.g. subtract) the at least one sensed air parameter values sensed for the supply air measurement and the at least one sensed air parameter values sensed for the return air measurement to obtain one or more corresponding differential air parameter values. By using differential air parameter values, the effects of sensor drift and other inaccuracies may be reduced. The indoor air quality (IAQ) control module may alternate between sampling the supply air and the return air using the valve (e.g., a 3-way solenoid valve, two or more discrete valves, etc.), and may compute a sequence of differential air parameter values over time.

The indoor air quality (IAQ) controller may generate a control signal based on the one or more differential air parameter values. In some cases, the control signal may be used by an airflow control device (e.g., a zone damper controller) or be sent to another controller (e.g., a thermostat, a zone controller, a building controller, etc.) to control the airflow entering and/or leaving the corresponding zone, and to achieve a desired air quality in the zone. The control signal may be used by the airflow control device and/or controller to vary an air change rate for the zone, to control a valve to vary an amount of return air returned from the zone and/or exhaust air exhausted from the zone, or to provide a signal for controlling outside air management.

In some cases, an HVAC system may include a method for sensing one or more air parameters of a zone of a building, where the HVAC system may have a blower for providing supply air and for drawing return air from the zone. An illustrative method may include obtaining a supply air sample from the supply air that is supplied to a zone using a pressure created by the blower of the building HVAC system, and sensing at least one air parameter from the supply air sample. A return air sample may then be obtained from the return air that is drawn from the zone also using the pressure created by the blower of the building HVAC system, and sensing the same at least one parameter. At least one differential air parameter may then be determined using the sensed air parameter of the supply air sample and the sensed air parameter of the return air sample. In some cases, the at least one differential air parameter may be used with a mathematical equation to provide an indication of the air quality for the zone. The indication of the air quality for the zone may be an indication of air quality referenced to the one or more sensed differential air parameters, or an indication of an overall air quality combining the one or more sensed differential air parameters. Then, an environmental air quality signal (e.g., a control signal to an airflow control device such as a zone damper controller) that may be based, at least in part, on the differential air parameter value.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
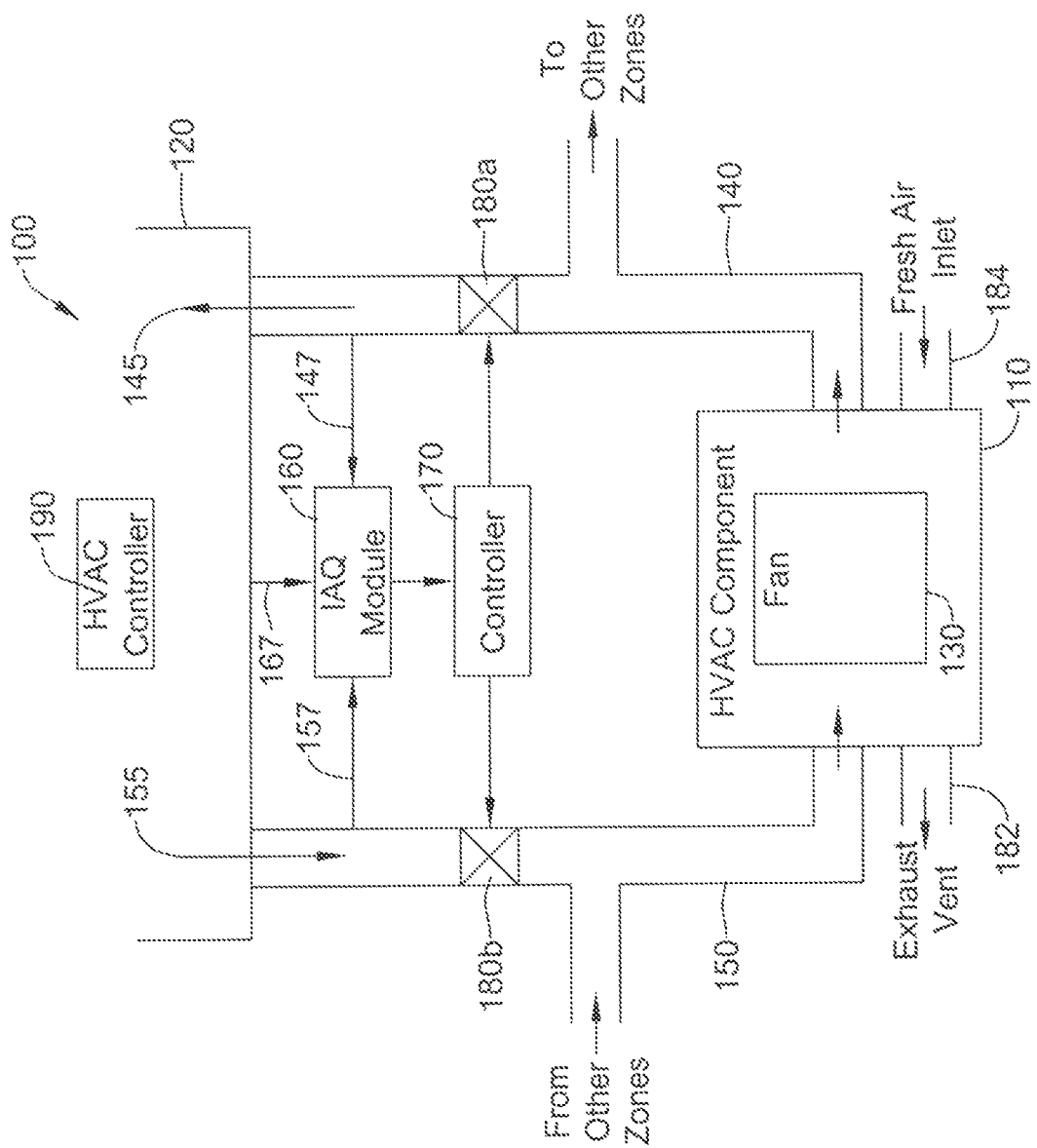
FIG. 1 is a schematic view of an HVAC system servicing a zone in a building.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings in which similar elements in different drawings are numbered the same. The description and the drawings, which are not necessarily to scale, depict illustrative embodiments which are not intended to limit the scope of the disclosure. The embodiments depicted are intended to be illustrative in nature. Selected features of any illustrative embodiment may be incorporated into an additional embodiment unless clearly stated to the contrary.

In one illustrative embodiment, an indoor air quality (IAQ) control module may be configured to differentially sense one or more parameters associated with a building zone's indoor environmental quality (IEQ) while minimizing the effects of sensor drift and other inaccuracies. For example, the IAQ control module may be configured to monitor one or more parameters associated with the indoor environmental quality of a building zone. The IAQ control module may include one or more sensors configured to monitor the one or more indoor environmental quality parameters for the zone. In some embodiments, the IAQ control module may differentially sense IEQ parameters using a sample of supply air obtained from air delivered to the building zone, and a return air sample obtained from the air returned or exhausted from the building zone. To sample the supply air and the return air, the IAQ control module may include a valve, such as a controllable 3-way solenoid valve, configured to alternate between supplying a supply air sample and a return air sample to the one or more sensors of the IAQ control module.

In some embodiments, the supply air sample may be sampled from the supply air delivered to the zone using the positive static air pressure within the supply air ductwork. Similarly, the return air sample may be obtained from the exhaust/return air exhausted from the zone using the velocity pressure within the return air ductwork. By using the air pressure and/or velocity pressure produced by the fan or blower of the HVAC system, air may be sampled from the HVAC system without using a separate vacuum pump or complex flow metering system. In some examples, the IAQ control module may be configured to also obtain a zone air sample directly from the zone. When a zone air controller, such as a venturi-type valve, is used to control the supply airflow and/or the return airflow, the zone air sample may be taken using a pressure differential between the return air duct and the supply air duct. However, in cases where the pressure differential is insufficient to obtain the zone air sample, such as when a damper system is used or when a zone air sampling tube is greater than a specified length, a pump may be used to obtain the zone air sample. In some embodiments, the IAQ control module may provide an output signal that is configured to control an amount of air supplied and/or exhausted from the building zone. For example, an output of an IAQ control module may be wired or otherwise in communication with a supply and/or exhaust air controller, such as a supply and/or exhaust air valve controller provided by Phoenix controls, and directly or indirectly control an amount of air supplied and/or exhausted from the building zone. In some embodiments, the IAQ control module may be communicatively coupled to an existing building controller or zone controller, to provide information relevant to controlling airflow to and/or from that particular zone in the building to achieve a desired air quality in the zone.

In some embodiments, the IAQ control module may be located adjacent to the building zone associated with the IAQ control module. In some cases, the IAQ control module may be configured to be located adjacent to ductwork configured to supply air to the zone and exhaust air from the zone. In some instances, the IAQ control module may be mounted adjacent to a zone controller, such as a supply and/or an exhaust valve controller, where the supply and/or exhaust valve controller is configured to control an amount of air supplied and/or exhausted from the zone.

In one illustrative embodiment, the IAQ control module may be configured to receive a supply air sample using the static pressure of the HVAC system via a pressure tap affixed to ductwork supplying air to the zone. Similarly, the IAQ control module may be configured to receive a return air sample using the velocity pressure of the HVAC system via a pressure tap affixed to ductwork exhausting air from the zone. In some cases, the return air sample may be obtained using an amplification cone or 'funnel' on the end of flexible tubing within the return air ductwork. After sensing one or more air quality parameters from the supply air sample and/or the return air sample, the air samples may be vented into an area in which the IAQ control module is mounted. For example, the air may be vented into the area surrounding the IAQ control module, such as a space containing the supply air and return air ductwork. This may include a wall cavity, a space above a drop ceiling, or any other space as desired. In some cases, the air samples may be vented to, for example the return air duct.

FIG. 1 is a schematic view of an HVAC system 100 servicing a zone 120 in a building or other structure. In some embodiments, the HVAC system 100 may include an HVAC component 110 configured to supply air to the zone 120 of the building. The HVAC component 110 of FIG. 1 may include a fan or blower, such as fan 130, to provide supply air 145 to the zone 120 using ductwork, such as supply duct 140. Similarly, the HVAC component 110 may draw return air 155 from the zone 120 using return ductwork, such as return duct 150.

The HVAC system 100 may include an indoor air quality (IAQ) control module 160 configured to receive a sample of air supplied to the zone 120, such as via a supply air sample line 147, and to receive a sample of air exhausted from the zone 120, such as via a return air sample line 157. In some cases, the IAQ control module 160 may be configured to receive a sample of air within the zone, such as via a zone air sample line 167. The IAQ control module 160 may be configured to provide a signal to a zone controller, such as zone controller 170, to control an amount of air that is supplied to the zone 120 and/or an amount of air exhausted from the zone. In some cases, the zone controller 170 may control a supply airflow device 180A and/or a return airflow device 180B. In some cases, the IAQ control module 160 may provide a signal directly to the supply airflow device 180A and/or the return airflow device 180B. In other cases, the IAQ control module 160 may provide IEQ information or a control signal to a building controller, such as a building controller 190, and building controller 190 may supply control signals to supply airflow device 180A and/or a return airflow device 180B.

An HVAC system, such as the HVAC system 100, may be designed to provide heating, ventilation, and/or air conditioning to one or more zones in a building, such as zone 120. The HVAC system 100 may include a building controller 190 to control one or more functions of the HVAC system 100, such as regulating temperature, relative humidity, airflow from the HVAC component 110, exhaust fan operation, chiller operation, economizer functions, pressurization of the building or duct static pressure, and/o other environmental airflows and functions. In some cases, the HVAC system 100 may communicate with one or more other building control systems or sub-systems, such as security systems, or fire alarm systems. In some embodiments, the HVAC system 100 may include one or more pneumatic, electric, electronic, microprocessor, computer or web based controllers, but this is not required. In some embodiments, components of the HVAC system 100 may communicate via a wired communication link (e.g., such as direct analog wiring or using a wired communication protocol), and/or via a wireless communication link (e.g., Ethernet, Bluetooth, etc.) In some embodiments, the HVAC system 100 may be a portion of a building control network with other building control systems, such as refrigeration systems, security systems, fire alarm systems, and the like. Such systems may include centralized monitoring functions or control capabilities from a central location in the building or at another physical location. Such building control systems may include building management systems, facility control systems, or facility management systems.

In some embodiments, the HVAC system 100 may include an air handling unit configured to mix some percentage of outside air with return air when supplying air to the zone 120. In some cases, the HVAC system 100 may provide air to specialized zones within a building, such as a laboratory or a clean room, which exhaust all the air supplied to the zone. In some embodiments, an HVAC system 100 may provide air to one or more zones within a building where various environmental parameters may be monitored to help the indoor environmental quality (IEQ) to remain within a specified standard. For example, the building control system 100 may include the IAQ control module 160, which may be configured to monitor one or more air quality parameters to help the indoor environmental quality to remain within a predetermined air quality standard.

It is contemplated that one or more air quality parameters may be measured using one or more sensors, which may include but are not limited to parameters corresponding to certain potentially harmful or irritating chemical, biological or radiological composition elements or properties of the air potentially within the building 105. For example, sensors may be provided to detect carbon dioxide ($CO_2$), carbon monoxide (CO), particulates of various sizes, smoke, allergens, aerosols, Total Volatile Organic Compounds (TVOCs) such as formaldehyde, NO, NOX, SOX, $SO_2$, $H_2S_2$, chlorine, nitrous oxide, methane, hydrocarbons, ammonia, refrigerant gases, radon, ozone, radiation, biological and/or chemical terrorist agents, other toxic gases, mold, other biologicals, and/or other contaminants of interest. These are just some examples.

Zone 120 may be a room, a set of rooms, or a portion of a space within the building. For example, zone 120 may include a room, or two or more rooms with one or more adjacent spaces such as corridors. In some embodiments, zone 120 may be a space enclosed by walls. In other embodiments, zone 120 may be a monitored area within a larger space. In some embodiments, two or more zones may be ventilated individually due to an individualized environment of one or more of the zones. Such zones with individualized environments may include an office, a healthcare environment (e.g., a patient room, a surgery suite, an examination room, a laboratory space, or common areas such as a cafeteria, an atrium or a corridor, etc.), a laboratory environment (e.g., a chemistry laboratory, a biological laboratory, etc.), a manufacturing and/or process control environment, (e.g., a clean room, a paint booth, or other areas exposed to toxic and/or noxious substances), an internal combustion engine environment (e.g., a dynamometer, a repair bay, a garage, etc.), a public environment (e.g., public buildings such as court houses or museums, subways, tunnels, sporting facilities, etc.), or any other individualized environment.

In some embodiments, the HVAC system 100 may include an exhaust vent 182 configured to exhaust air from the zone 120 to an area outside the building, and a fresh air inlet 184 for receiving fresh air from outside the building. In some cases, the exhaust vent 182 may be configured to divert at least a portion of the return airflow in the return air duct 150 to the area outside the building, rather than returning the air to the HVAC component 110. Likewise, the fresh air inlet 184 may be configured to mix fresh air from the fresh air inlet 184 with the supply air 145 in the supply air duct 140.

The exhaust vent 182 may include an exhaust airflow control device similar to the airflow control devices 180A, 180B, where the exhaust airflow control device may receive a signal from the IAQ control module 160 (or other control device) to control at least a portion of the exhaust airflow. Likewise, the fresh air inlet 194 may include an fresh airflow control device similar to the airflow control devices 180A, 180B, where the fresh airflow control device may receive a signal from the IAQ control module 160 (or other control device) to control how much fresh air is admitted into the fresh air inlet 184 and thus into the supply air duct 140. In some cases, a heat exchanger (not explicitly shown) may be used to transfer thermal energy between the exhausted air and the fresh air, if desired.

In some embodiments, the HVAC system 100 may be configured for applications in which, under normal operating conditions, the air output from the zone 120 (e.g., return air 155) may be configured as 100% return air, 100% exhaust air, or as some specified ratio of return air and exhaust air. Likewise, the air input to the zone 120 (e.g., supply air 145) may be configured as 100% return air, 100% fresh air, or as some specified ratio of return air and fresh air. The term "return" duct is used to refer to a duct that returns air to the air handler unit and/or to the outside as exhaust air. More generally, the term "return", such as in "return air", refers to air leaving the zone.

For example, a room may include a return air duct for returning air to the air handling unit and/or a return air duct configured for exhausting air outside the building, such as for a patient environment in a hospital. In some cases, it may be desirable to configure the ducts for 100% exhaust air (e.g., a quarantine situation), or for 100% return air or other specified ratio of return air to exhaust air (e.g., an unoccupied room, or non-quarantine situation). In another example, a laboratory environment may include one or more fume hoods and/or other exhaust air mechanisms. In some cases, when the fume hoods are operational, the return airflow may be controlled so that the return air to exhaust air ratio is controlled at a specified value. If, for example, the fume hoods are inactive (e.g., an unoccupied laboratory), the airflow may be configured as 100% return air to save energy.

In some cases, the system may be suitable for situations in which output air drawn from the room (e.g., return air 155) normally is returned to the HVAC component 110, but in the event of a high contaminant event or other environmental hazard (e.g., smoke, fire, laboratory spill), all of the output air (e.g., return air 155) may be diverted as exhaust air through the exhaust vent 182.

In some instances, any one or all of the airflow control devices (e.g., the supply airflow device 180A, the return airflow device 180B) may include a simple damper, a venturi-type valve, or any other suitable airflow control device. A venturi-type valve is often capable of both controlling airflow based on a received command, and outputting a calibrated airflow signal. In some cases, a venturi-type valve used for the return airflow device 180B may receive a return airflow command from the IAQ control module 160, and may output a return airflow signal that can be communicated, for example, to the IAQ control module 160, the HVAC controller 125, and/or any other suitable control module, as desired.

A venturi-type valve generally is shaped so as to have a converging inlet portion (i.e. converging in the direction of flow) and a diverging outlet portion (i.e. diverging in the direction of flow) which form a "throat" at the junction of the converging and diverging portions. These valves typically have pneumatic, electric, or electronic actuation to provide constant volume, two-state, multiple state, or variable air volume control. These devices often have large turndown or flow ranges that make them suitable for control of dilution ventilation that can have wide flow ranges to achieve good energy savings and/or safety. Inside the valve, and in some cases, a cone and spring assembly may be attached to a shaft having a controllable position which moves along an axis through the center of the valve body, along the direction of flow. The cone may be positioned adjacent to the throat of the body so as to create a ring-shaped orifice. When air flows through the venturi-type valve, the cone converts a pressure drop across the ring-shaped orifice into a force which is applied to the spring. The spring then may move to maintain a constant flow rate for a given shaft position, independent of pressure drops across the valve. Accordingly, the shaft position may represent a particular airflow through the valve. Hence, a flow command may be applied to the venturi-type valve to actuate the shaft so as to position the cone, and an indication of the resulting shaft position may be calibrated and provided by the valve as a calibrated airflow signal.

More generally, the airflow control devices 180A, 180B may be any suitable devices for controlling the air flow volume and/or velocity through one or more of the supply air duct 140 and/or the return air duct 150. Such devices may use a damper or other throttling device (e.g., a single round, square, or rectangular blade damper, a multiple blade damper, a set of pneumatic bladders, etc.) that can be used to partially and/or fully seal off an opening, or any other type of throttling device that can be used to partially and/or fully seal off a duct. In some cases, the airflow control devices 180A, 180B may include a pneumatic, electric, or electronic actuator that is controlled by a pneumatic, electronic, digital, or microprocessor based controller. In some instances, flow sensors of various types may be used to monitor the flow through the airflow control devices 180A, 180B, such as those based on single or multiple velocity pressure sensors, hot wire, heated thermistor, microelectronic flow sensor, etc, but this is not required.

Figure 2:
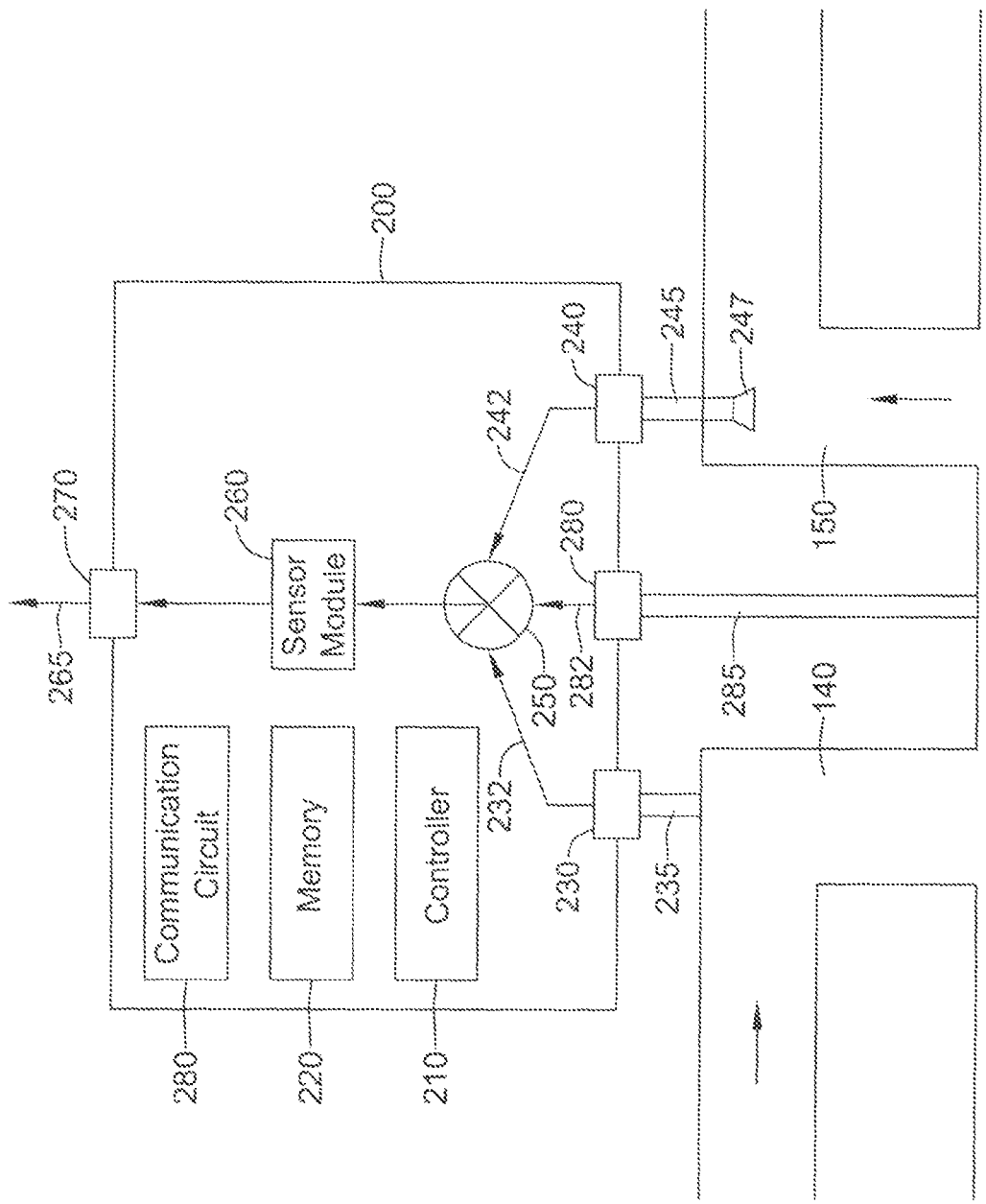
FIG. 2 is a schematic view of an illustrative indoor air quality (IAQ) control module for sensing a parameter associated with indoor air quality of a zone in a building.

FIG. 2 is a schematic view of an illustrative indoor air quality (IAQ) control module 200 for sensing a parameter associated with indoor environmental quality of a zone 120 in a building. In the illustrative embodiment, a distributed IAQ control module 200, which may be the same or similar to the IAQ control module 160 of FIG. 1, may include a controller 210 (e.g. microprocessor, microcontroller, etc.), a memory 220, a first pressure tap 230, a second pressure tap 240, a solenoid valve 250, a sensor module 260, an exhaust vent 270, and a communication circuit 280. The first pressure tap 230 may be configured to be fluidly coupled to a supply air duct 140 of the HVAC system 100 for receiving a supply air sample 232 from the supply air duct 140, where the supply air sample may be sampled using the air pressure created by the blower 130 of the HVAC system 100. The second pressure tap 240 may be configured to be fluidly coupled to a return air duct 150 of the HVAC system 100 for receiving a return air sample 242 from the return air duct 150, where the return air sample 242 may be sampled using the velocity pressure created by the blower 130 of the HVAC system 100. The IAQ control module 160 may direct the supply air sample 232 and/or the return air sample 242, while still under the pressure of the HVAC system 100, past at least one sensor in the sensor module 260, and in some cases, to the exhaust vent 270. The sensor module 260 may be configured to sense the one or more air parameters from the supply air sample 232 before the supply air sample exits the IAQ control module 200 through the exhaust vent 270. The controller 210 may be programmed to store one or more supply air parameter values sensed by the sensor module 260 into the memory 220.

The controller 210 may then be programmed to activate the solenoid valve 250 such that the sensor module 260 can sense one or more air parameters from the return air sample 242 before the return air sample 242 exits the IAQ control module 200 through the exhaust vent 270. The controller 210 may then compare (e.g. subtract) the at least one sensed air parameter values sensed from the supply air sample 232 and the at least one sensed air parameter values sensed from the return air sample 242 to obtain one or more corresponding differential air parameter values. By using differential air parameter values, the effects of sensor drift and other inaccuracies associated with the sensors in the sensor module 260 may be reduced. The indoor air quality (IAQ) control module 200 may alternate between sampling the supply air sample 232 and the return air sample 242 the valve 250, and may compute a sequence of differential air parameter values over time. The indoor air quality (IAQ) control module 200 may generate a control signal based on the one or more differential air parameter values. In some cases, the control signal may be communicated to the airflow control devices 180A, 180B (see FIG. 1) via the Communications Circuit 280 (or be sent to another controller such as a thermostat, a zone controller, a building controller, etc.) to control the airflow entering and/or leaving the zone 120, and to achieve a desired air quality in the zone. The IAQ control module 200 may include one or more modes of operation for using the control signal. For example, the control signal may be used for at least one of controlling an air change rate for the zone by controlling the supply airflow rate, controlling an amount of outside air introduced into the HVAC system, or by controlling an exhaust airflow to return airflow ratio.

In some embodiments, the IAQ control module 200 may be physically located adjacent to the return air duct 150, which draws air from the zone 120, and/or the supply air duct 140, which supplies air to the zone 120. In some embodiments, the IAQ control module 200 may be located adjacent to an airflow control device, such as the return airflow device 180B, where the return airflow device controls the amount of air drawn from the zone 120 through the return air duct 150.

In some examples, the first pressure tap 230 may be connected to the supply air duct 140 by a medium that is capable of transferring the supply air sample 232 from the supply air duct 140 to the IAQ control module 200, such as flexible and/or rigid tubing 235. Similarly, the second pressure tap 240 may be connected to the return air duct 150 by a medium that is capable of transferring the return air sample 242 from the return air duct 150 to the IAQ control module 200, such as flexible and/or rigid tubing 245. The positive static pressure contained in the supply duct 140 (e.g., provided by the fan 130 of the HVAC system) may be capable of forcing an air sample through the flexible and/or rigid tube 235, through the valve 250 and to the sensor module 260.

The controller 210 may be programmed to cause the IAQ control module 200 to alternate between sensing the supply air sample 232 and the return air sample 242 using an airflow routing device, such as the solenoid valve 250. For example, the solenoid valve 250 may be a controllable 3-way solenoid valve having two input ports and an output port. The 3-way solenoid valve 250 may route the supply air sample 232 from the first pressure tap 230, through a first input of the valve 250 and out the output port of the valve 250, such that the supply air sample 232 is routed through the sensor module 260 and out the exhaust vent 270. Similarly, the 3-way solenoid valve 250 may be configured to route the return air sample 242 from the second pressure tap 240, through a second input of the valve 250, and out the output port of the valve, such that the return air sample 242 is routed through the sensor module 260 and out the exhaust vent 270. The solenoid valve 250 may include one or more control inputs such that the controller 210 can cause the solenoid valve 250 to alternate between providing the supply air sample 232 and the return air sample 242 to the sensor module. The controller may allow the supply air sample 232 to be sensed over a first time period, and the return air sample 242 to be sensed over a second time period. In some cases, the first time period may be equal to the second time period. In other cases, the first time period may be different than to the second time period.

In some cases, the controller may be programmed to cause the IAQ control module 200 to obtain a zone air sample using the solenoid valve 250. In some cases, the solenoid valve 250 may be a 4-way solenoid valve, or may be a combination of solenoid valves. For example, the 4-way solenoid valve may route the zone air sample 282 from a third pressure tap 280 through a third input of the valve 250 and out the output port of the valve 250, such that the zone air sample 282 is routed through the sensor module 260 and out the exhaust vent 280. In some cases, the controller 210 can cause the solenoid valve 250 to alternate between providing the supply air sample 232, the return air sample 242, and/or the zone air sample 282 to the sensor module. The controller may allow the supply air sample 232 to be sensed over a first time period, the return air sample 242 to be sensed over a second time period, and the zone air sample 282 to be sensed over a third time period. In some cases, the first time period may be equal to the second time period and the third time period. In other cases, the first time period may be different than the second time period and/or the third time period.

When the static pressure is present (e.g., during normal operation), the tube length of the supply-side flexible and/or rigid tube 235 can be significantly longer than the length of the flexible and/or rigid tubing 245 on the return air duct. In some cases, the velocity pressure within the return air duct 150 may be sufficient to force a return air sample 242 through the flexible and/or rigid tubing 245 and through the sensor module 260, without using any amplification. In some cases, and without amplification, the length of the flexible and/or rigid tubing 245 may be limited by the velocity pressure and/or the tube diameter, but the velocity pressure in the return air duct 150 can be sufficient to allow the return air to be sampled, particularly when the sensor module 260 is mounted on or near the airflow control devices 180B. Optionally, the return air sample 242 may be taken using an amplification system (e.g., a cone, a funnel, etc.) for amplifying or enhancing the velocity pressure. For example, an amplification funnel 247 may be used to take advantage of the velocity pressure of the air moving in the return air duct 150.

In some cases, the zone air sample 282 may be obtained using a pressure differential between the supply air duct and the return air duct. For example, the pressure differential may exist when the flexible and/or rigid tubing 235 is connected upstream of a valve controller (e.g., a venturi-type valve) on the supply ductwork 230 and the flexible and/or rigid tubing 245 is connected downstream of a valve controller on the return ductwork 240. In some embodiments, the zone air sample 282 may be obtained using a pump (not pictured) when a pressure differential is below a specified threshold. For example, the pressure differential may be insufficient to obtain the zone air sample 282 (e.g., within a specified time period) when the flexible and/or rigid tubing 285 is longer than a specified length and/or damper systems are used to control the airflow in the supply air duct 230 and/or the return air duct 240. In some cases, the pressure differential between the supply air duct and the return air duct may be used to calculate a sampling time for obtaining the supply air sample 232, the return air sample 242, and/or the zone air sample 282.

The supply air sample 232 may be routed, still under the air pressure of the HVAC system 100, through the sensor module 260, before being vented from the IAQ control module 160 via the vent 270. The vent 270 may vent the sample back to the zone 120, to an area adjacent to the zone 120, to the return air duct 150, or to any other suitable location. The sensor module 260 may be configured to sense at least one air parameter, where the air parameter may correspond to an air quality parameter of the zone 120. Likewise, the return air sample 242 may be routed, still under the velocity pressure of the HVAC system 100, through the sensor module 260, before being vented from the IAQ control module 160 via the vent 270. In some embodiments, the sensor module 260 may be configured to sense one or more air parameters from the supply air sample 232, and to sense the same one or more air parameters from the return air sample 242.

The controller 210 may use an algorithm to cause the IAQ control module 200 to obtain a supply air sample 232, and to obtain a return air sample 242 on a specified schedule. The controller 210 may be configured to operate the algorithm using an operating system, such as an embedded operating system (e.g., QNX, NiagaraAX, etc.). In some cases, the controller 210 may operate using an algorithm that cause the solenoid valve 250 to alternate between routing the supply air sample 232 from the first pressure tap 230, through the valve 250, through the sensor module 260 and to the vent 270, and routing the return air sample 242 from the second pressure tap 240, through the valve 250, through the sensor module 260 and to the vent 270. The algorithm may include instructions for the sensor to sense each of one or more air parameters at the same time, or at different times. For example, the controller 210 may cause the sensor module 260 to sense a first air parameter and a second air parameter at the same sampling rate (e.g., about ten seconds). In another example, the controller 210 may cause the sensor module 260 to sense the first air parameter at a first sampling rate (e.g., about ten seconds) and a second air parameter at a second sampling rate (e.g., about one minute).

In some cases, the IAQ control module 200 may include a timer (not shown) that may be used to determine a sampling time for obtaining the supply air sample 232 and the return air sample 242. The timer may be integral to the controller 210 or may be provided as a separate component. The timer values may be predetermined values that may be stored as timer parameters in the memory 220. The timer parameters may be configurable by a user, such as by using an optional user interface on the IAQ control module 200, or by using an external device, such as the controller 190 or a computer, using a communication link such as communication circuit 280. In some instances, the timer values may vary as a function of one or more of the sensed parameters (e.g., the air parameters sensed using the sensor module 260) or as a function based on an externally provided command or signal.

Further, the controller 210 may operate using an algorithm to compute a first differential air parameter between a first air parameter sensed from the supply air sample 232, and the same first air parameter sensed from the return air sample 242, and may store one or more of differential air parameters, the first air parameter of the supply air sample 232 and/or the first air parameter of the return air sample 242 into the memory 220. The controller 210 may then determine one or more control signals based on the differential air parameter(s) and provide the control signals to one or more devices, such as an airflow control device 170 (see FIG. 1). In some cases, the controller 210 may determine one or more control signals based on one or more of the first air parameter of the supply air sample 232 and/or the first air parameter of the return air sample 242.

In some cases, the controller 210 may operate using an algorithm to compute an air quality parameter for the zone. For example, the air quality parameter may be calculated using a mathematical equation using one or more air parameters obtained from one or more of the supply air sample 232, the return air sample 242, and/or the zone air sample 282. In some cases, the IAQ control module 200 may be communicatively coupled to the airflow control device 170 via communications circuitry 280. In response, the airflow control device 170 may control one or more air valves (e.g., the supply airflow device 180A, the return airflow device 180B) to achieve a desired air quality in the zone 120. In some cases the controller 210 may provide the control signal directly to one or more of the supply airflow device 180A, the return airflow device 180B, building controller 190, or any other suitable device.

In some cases, the controller 210 may operate using an algorithm to compute a control signal for controlling the airflow routing device, such as the solenoid valve 250. For example, sensing module 260 may include a total pressure sensor so that the controller 210 may calculate the solenoid valve control signal using a differential pressure value obtained using a pressure value sensed from the supply air sample 232 and a pressure value sensed from the return air sample 242. In some cases, the algorithm may use the length, cross-sectional area and/or other parameters of the tubing for obtaining the air samples, such as the tubing 235, the tubing 245 and/or the tubing 285, to calculate the solenoid valve control signal. As stated above, the calculated solenoid valve control signal may allow solenoid valve 250 to sense the supply air sample 232 over a first time period, the return air sample 242 over a second time period, and the zone air sample 282 over a third time period, such that the volume of the supply air sample 232 moving past the sensor module 260 is substantially similar to the volume of the return air sample 242 moving past the sensor module 260 and/or the volume of the zone air sample 282 moving past the sensor module 260. In some cases, the pressure differential between the supply air duct 230 and return air duct 240 may be insufficient to obtain the zone air sample 282 within a specified time period (e.g., when using damper systems, when the length of the tubing 285 is greater than a specified value, etc.). In such cases, the controller 210 may generate a solenoid valve control signal such that the sampling time for the zone air sample 282 (e.g., the third time period) is greater than the sampling time for the supply air sample 232 (e.g., the first time period) and/or the sampling time for the return air sample 242 (e.g., the second time period).

The memory 220 of the illustrative IAQ control module 200 may be in communication with controller 210. The memory 220 may be used to store any desired information, such as the aforementioned algorithm, set points, schedule times, trending information, diagnostic limits such as, for example, differential air parameter limits, differential air parameters, sensed air parameters and the like. The memory 220 may be any suitable type of storage device including, but not limited to, RAM, ROM, EPROM, flash memory, a hard drive, and/or the like. The memory 220 may be one or more separate components or integrated with other components, such as the controller 210. In some cases, controller 210 may store information within memory 220, and may subsequently retrieve the stored information for later use.

The sensor module 260 of the IAQ control module 200 may include one or more sensors configured to sense at least one air parameter. In some instances the sensed air parameters may be environmental parameters or air quality parameters. In some instances, environmental parameters of interest may include relative humidity, dew point temperature, absolute humidity, wet bulb temperature, enthalpy, total pressure, etc. In some instances, the sensor module 260 may be used for detecting certain potentially harmful or irritating chemical, biological or radiological composition elements or properties of the air within the zone 120. For example, the sensors may be used to detect carbon monoxide (CO), carbon dioxide ($CO_2$), particulates of various sizes, allergens, smoke, aerosols, Total Volatile Organic Compounds (TVOCs) such as formaldehyde, NO, NOX, SOX, SO2, H2S2, chlorine, nitrous oxide, methane, hydrocarbons, ammonia, refrigerant gases, radon, ozone, radiation, biological and/or chemical terrorist agents, other toxic gases, mold, other biologicals, and/or other contaminants of interest. In some instances, the IAQ control module 200 may include the communication circuit 280. The communication circuit 280 may be configured to communicate indoor air quality information to one or more external devices, such as the airflow controller 170, zone controller 190 and/or any other suitable device. The communication circuit 280 may include a wireless port, such as a port used for Bluetooth™ or any other wireless protocol. In other cases, the communication circuit 280 may include a wired port such as a serial port, an ARCNET port, a parallel port, a CAT5 port, a USB (universal serial bus) port, and/or the like. In some cases, the communication circuit 280 may use one or more communication protocols, such as Ethernet, BACNet, LONtalk, etc., that may be used via a wired network or a wireless network. In some cases, the wired port may be configured to provide an analog control signal (e.g., a 4-20 mA control signal, a 0-10V control signal) or a digital control signal (e.g., a logical value to turn a fan on or off). In some instances, the communication circuit may include a USB port and may be used to download and/or upload information from a USB flash drive or some other data source. Other remote devices may also be employed, as desired.

The communication circuit 280 may be configured to communicate with the controller 210 and may, if desired, be used to upload information to the controller 210 and/or download information from controller 210. In some cases, the information may be uploaded to the memory 220, or downloaded from the memory 220. Information that can be uploaded and/or downloaded may include, for example, values of operating parameters, historical sensed data, algorithms, threshold values, and/or any other suitable data. In some instances, the communication circuit 280 may be used to upload a previously-created configuration for sensing air parameters into the IAQ control module 200. In some cases, the communication circuit 280 may be used to download information obtained by the IAQ control module 200, such as trending information or air parameter information. In some cases, communication circuit 280 may be used to download data stored within the memory 220 for analysis. For example, communication circuit 280 may be used to provide an air parameter log or differential parameter trending information or parts thereof to a remote device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XML, and/or Adobe PDF® file, but this is certainly not required.

Figure 3:
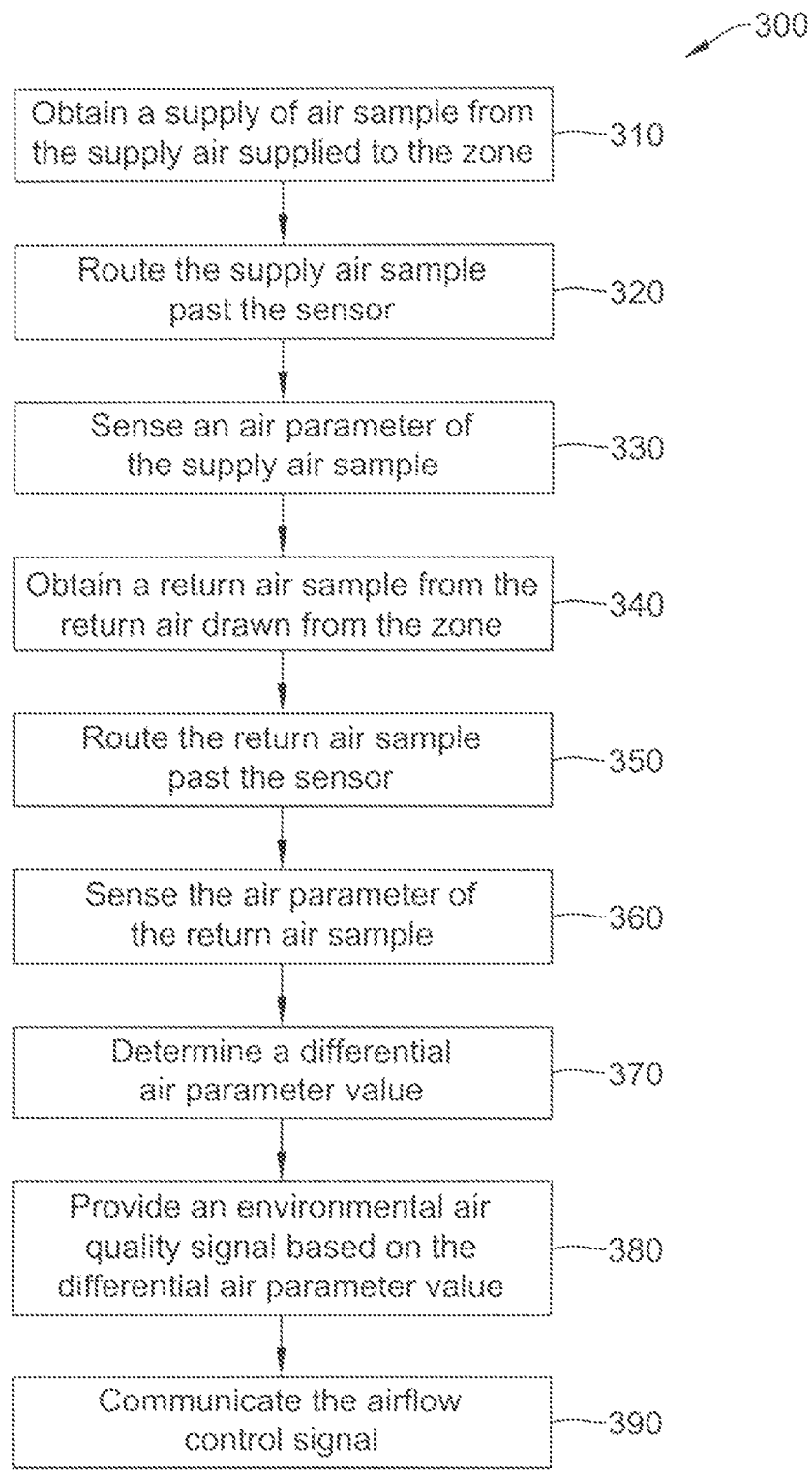
FIG. 3 provides a flow chart of an illustrative method for providing a control signal to improve indoor air quality for a zone in a building.

FIG. 3 provides a flow chart of an illustrative method 300 for providing a control signal to improve indoor air quality for a zone in a building. At 310, an IAQ control module, such as the IAQ control module 160 and/or 200 of FIGS. 1 and 2, may obtain a supply air sample using a controller, such as the controller 210 of FIG. 2 from the supply air duct 140. As discussed above, the supply air sample may be obtained under the pressure within the HVAC system produced by the fan or blower 130. At 320, the controller 210 may route the supply air sample through the sensor module 260 using the solenoid valve 250. At 330, the sensor module 260 senses one or more air parameters from the supply air sample, and the controller 210 stores the sensed air parameter values in a memory 220 for later use. The sensor module may include one or more sensors (e.g., a CO sensor, a particulate sensor, a VOC sensor, a temperature sensor, a humidity sensor, a total pressure sensor, etc.), and each sensor may sense an air parameter from the supply air sample before the air sample is vented through the exhaust vent 265.

At 340, the controller 210 may cause the IAQ control module 200 to obtain a return air sample, such as from the return duct 150 and/or obtain a zone air sample from the zone 120. In one example, the controller 210 may send a command to the solenoid valve 250 to switch from a first input associated with the supply air sample to a second input associated with a return air sample and/or the zone air sample. As discussed above, the return air sample may then be obtained under the velocity air pressure within the return air duct 150 and/or the zone air sample may be obtained using the pressure differential between the supply air duct and the return air duct. At 350, the controller 210 routes the return air sample and/or the zone air sample through the sensor module 260 using the solenoid valve 250. At 360, the sensor module 260 senses the same one or more air parameters from the return air sample and/or the zone air sample, as were sensed for the supply air sample. The controller 210 may store the sensed air parameter values in the memory 220 for later use.

At 370, the controller 210 may determine a differential value between the sensed air parameter obtained from the supply air sample and the same sensed air parameter obtained from the return air sample and/or the zone air sample. For example, the controller 210 may compute a simple difference (e.g. subtraction) between the air parameter value sensed from the supply air sample 232 and the air parameter value sensed from the return air sample 242. In other cases, the controller 210 may compute a differential value using a function or other algorithm. In some cases, the controller 210 may calculate a first differential value using at least first sensed air parameters from both the supply air sample and the return air sample, and a second differential value using second sensed air parameters from both the supply air sample and the return air sample.

At 380, the controller 210 may generate a control signal or command using the computed differential value(s). For example, the control signal or command may be configured to control an airflow control device, such as the airflow controller 170 or the airflow control valve (e.g., the supply airflow device 180A, the return airflow device 180B, etc.). In some cases, the controller 210 may generate a control signal or command that is configured to be sent to a separate HVAC controller 190, such as a zone controller or a building controller, where the separate HVAC controller controls the airflow to the zone 120 using the information received from the IAQ control module 200. At 390, the IAQ control module 200 communicates the control signal or command, or other information, to one or more devices to control the airflow to and/or from the zone 120. For example, the IAQ control module 200 may communicate the generated control signal via a wired or wireless communication link to an airflow control device, such as the airflow controller 170. In some cases, the IAQ control module 200 may communicate the control signal and/or sensor information (e.g., the air parameter sensed from the supply air sample, the air parameter sensed from the return air sample, the differential air parameter, etc.) to an HVAC controller 190, such as a building controller or zone controller.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed

What is claimed is:

1. An indoor air quality (IAQ) control module for providing a signal to one of a plurality of zone controllers of a building, the building having an HVAC system that is controlled by an HVAC controller that is operatively coupled to the plurality of zone controllers, each of the zone controllers controlling a corresponding one of a plurality of zones of the building, the HVAC system further including a blower for supplying supply air to the plurality of zones of the building via a supply air duct and for drawing return air from the plurality of zones of the building via a return air duct, each zone controller controlling a corresponding supply airflow device that controls the flow of supply air into the corresponding zone from the supply air duct, the indoor air quality control module associated with one of the zone controllers and comprising:
   at least one sensor;
   a first pressure tap for receiving a supply air sample from the supply air that flows into the corresponding zone under a pressure created by the blower of the HVAC system, the indoor air quality control module directing the supply air sample past the at least one sensor and to a vent, the supply air sample being pushed through the first pressure tap, past the at least one sensor and to the vent by the pressure created by the blower of the HVAC system, the at least one sensor configured to sense a first air parameter of the supply air sample before the supply air sample exits through the vent;
   a second pressure tap for receiving a return air sample from the return air drawn from the corresponding zone under a pressure created by the blower of the HVAC system, the indoor air quality control module directing the return air sample past the at least one sensor and to the vent, the return air sample being pushed through the second pressure tap, past the at least one sensor and to the vent by the pressure created by the blower of the HVAC system, the at least one sensor configured to sense the first air parameter of the return air sample before the return air sample exits through the vent;
   a controller for causing the indoor air quality control module to alternate between sensing the first air parameter of the supply air sample and sensing the first air parameter of the return air sample, and to output a measure that is related to a differential between the sensed first air parameter of the supply air sample and the sensed first air parameter of the return air sample to the zone controller such that the zone controller can regulate the supply air directed to the corresponding zone by the supply airflow device based on the measure that is related to the differential between the sensed first air parameter of the supply air sample and the sensed first air parameter of the return air sample, wherein the indoor air quality control module is a separate module from the HVAC controller and the corresponding zone controller.

2. The indoor air quality (IAQ) control module of claim 1, further comprising a funnel fluidly coupled to the second pressure tap, the funnel extending into the return air duct of the HVAC system and configured to help amplify the pressure created by the blower of the HVAC system in the return air sample.

3. The indoor air quality (IAQ) control module of claim 1, further comprising a flexible and/or rigid tube extending between the first pressure tap and the supply air duct.

4. The indoor air quality (IAQ) control module of claim 1, further comprising a single solenoid valve coupled to the indoor air quality control module controller, the indoor air quality control module controller causing the solenoid valve to alternate between directing the supply air sample past the at least one sensor and to the vent and directing the return air sample past the at least one sensor and to the vent.

5. The indoor air quality (IAQ) control module of claim 1, wherein the at least one sensor includes one or more of a particulate air contaminant sensor, a temperature sensor, a humidity sensor, a carbon dioxide sensor, a carbon monoxide sensor, and a volatile organic compound sensor.

6. The indoor air quality (IAQ) control module of claim 1, wherein:
   the at least one sensor is also configured to sense a second air parameter of the supply air sample before the supply air sample exits through the vent, and is configured to sense the second air parameter of the return air sample before the return air sample exits through the vent;
   the indoor air quality control module controller causing the indoor air quality control module to alternate between sensing the second parameter of the supply air sample and sensing the second air parameter of the return air sample; and
   the indoor air quality control module controller configured to output a measure that is related to a differential between the sensed second air parameter of the supply air sample and the sensed second air parameter of the return air sample to the zone controller such that the zone controller can regulate the supply air directed to the zone by the supply airflow device based on the measure that is related to the differential between the sensed second air parameter of the supply air sample and the sensed second air parameter of the return air sample.

7. An indoor air quality (IAQ) control module for a zone of a building, the building having an HVAC system with a blower for supplying supply air to the zone via a supply air duct, and for drawing return air from the zone via a return air duct, the zone further having one or more air control valves controlled by a zone controller that control an amount of supply air that is supplied to the zone via the supply air duct, the indoor air quality control module comprising:
   at least one sensor;
   a first pressure tap configured to be fluidly coupled to the supply air duct of the HVAC system for receiving a supply air sample from the supply air duct under a pressure created by the blower of the HVAC system, the indoor air quality control module directing the supply air sample past the at least one sensor and to an exhaust vent, the supply air sample being pushed by a first differential pressure between a pressure at the first pressure tap and a pressure at the at least one sensor that is created by the blower of the HVAC system, the at least one sensor configured to sense a first air parameter of the supply air sample before the supply air sample exits through the exhaust vent;

a second pressure tap configured to be fluidly coupled to the return air duct of the HVAC system for receiving a return air sample from the return air duct under pressure created by the blower of the HVAC system, the indoor air quality control module directing the return air sample past the at least one sensor and to the exhaust vent, the return air sample being pushed through the second pressure tap, past the at least one sensor and to the vent by the pressure created by the blower of the HVAC system, the at least one sensor configured to sense the first air parameter of the return air sample before the return air sample exits through the exhaust vent;

a controller for causing the indoor air quality control module to alternate between sensing the first air parameter of the supply air sample and sensing the first air parameter of the return air sample;

a memory in communication with the controller, the memory configured to store the first air parameter of the supply air sample and the first air parameter of the return air sample;

a communication circuit communicatively coupling the controller of the indoor air quality control module to the zone controller, wherein the zone controller is external to the indoor air quality control module;

the controller of the indoor air quality control module determining a measure that is related to a differential between the sensed first air parameter of the supply air sample and the sensed first air parameter of the return air sample; and the controller of the indoor air quality control module outputting one or more control signals to the zone controller that controls the one or more air control valves, the one or more control signals based, at least in part, on the measure related to the differential between the sensed first air parameter of the supply air sample and the sensed first air parameter of the return air sample.

8. The indoor air quality (IAQ) control module of claim 7, further comprising a funnel or cone fluidly coupled to the second pressure tap, the funnel or cone extending into the return air duct of the HVAC system and configured to help amplify the pressure created by the blower of the HVAC system in the return air sample.

9. The indoor air quality (IAQ) control module of claim 7, further comprising a single solenoid valve coupled to the controller, the controller causing the solenoid valve to alternate between directing the supply air sample past the at least one sensor and to the exhaust vent and directing the return air sample past the at least one sensor and to the exhaust vent.

10. The indoor air quality (IAQ) control module of claim 7, further comprising a flexible tube fluidly connecting the first pressure tap and the supply air duct.

11. The indoor air quality (IAQ) control module of claim 7, wherein the one or more air control valves includes a return air valve, and the zone controller controls the return air valve.

12. The indoor air quality (IAQ) control module of claim 7, wherein the one or more air control valves includes a supply air valve, and the zone controller controls the supply air valve.

13. The indoor air quality (IAQ) control module of claim 7, wherein the one or more air control valves includes a return air valve and a supply air valve, and wherein the zone controller controls the return air valve and the supply air valve.

14. The indoor air quality (IAQ) control module of claim 7, wherein the at least one sensor includes one or more of a particulate air contaminant sensor, a temperature sensor, a humidity sensor, a pressure sensor, a carbon dioxide sensor, a carbon monoxide sensor, and a volatile organic compound sensor.

15. A method for sensing one or more air parameters of a zone of a building HVAC system having a blower for providing supply air and for drawing return air from the zone and a first sensor, the method comprising:

obtaining a supply air sample from the supply air that is supplied to the zone using a pressure created by the blower of the building HVAC system;

obtaining a return air sample from the return air that is drawn from the zone also using the pressure created by the blower of the building HVAC system;

sensing an air parameter of the supply air sample using the first sensor, the supply air sample being pushed past the at least one sensor by a pressure of the supply air that is created by the blower of the HVAC system;

subsequently sensing the air parameter of the return air sample using the first sensor, the return air sample being pushed past the at least one sensor by a pressure of the return air that is created by the blower of the HVAC system;

determining at least one differential air parameter value using the sensed air parameter of the supply air sample and the sensed air parameter of the return air sample;

providing an environmental air quality signal that is based, at least in part, on the differential air parameter value; and controlling one or more air control valves that service the zone of the building using a zone controller based, at least in part, on the environmental air quality signal;

wherein obtaining the supply and return air samples, sensing the air parameters of the supply and return air samples, determining at least one differential air parameter value and providing the environmental air quality signal are performed by an indoor air quality control module that is separate from but configured to be in communication with the zone controller.

16. The method of claim 15, wherein the one or more air control valves includes a return air valve, and the method includes controlling the return air valve based, at least in part, on the environmental air quality signal.

17. The method of claim 15, wherein the one or more air control valves includes a supply air valve, and the method includes controlling the supply air valve based, at least in part, on the environmental air quality signal.

18. An indoor air quality (IAQ) control module for providing a signal to one of a plurality of zone controllers of a building, the building having an HVAC system that is controlled by an HVAC controller that is operatively coupled to the plurality of zone controllers, each of the zone controllers controlling a corresponding one of a plurality of zones of the building, the HVAC system further including a blower for supplying supply air to the plurality of zones of the building via a supply air duct and for drawing return air from the plurality of zones via a return air duct of the building, each zone controller controlling a corresponding supply airflow device that controls the flow of supply air into the corresponding zone from the supply air duct, the indoor air quality control module associated with one of the zone controllers and comprising:

at least one sensor;

a first pressure tap for receiving a first air sample of supply air that is directed by the supply airflow device to the corresponding zone under a pressure created by the blower of the HVAC system, the indoor air quality control module directing the first air sample past the at least one sensor and to a vent, the first air sample being pushed through the first pressure tap, past the at least one sensor and to the vent by the pressure created by the blower of the HVAC system, the at least one sensor configured to sense a first air parameter of the first air sample before the first air sample exits through the vent;

a second pressure tap for receiving a second air sample from air drawn from the corresponding zone using the pressure created by the blower of the HVAC system, the indoor air quality control module directing the second air sample past the same at least one sensor and to the vent, the second air sample being pushed through the second pressure tap, past the at least one sensor and to the vent by the pressure created by the blower of the HVAC system, the at least one sensor configured to sense the same first air parameter of the second air sample before the second air sample exits through the vent;

a third pressure tap for receiving a third air sample from air that is within the corresponding zone using the pressure created by the blower of the HVAC system, the indoor air quality control module directing the third air sample past the same at least one sensor and to the vent, the third air sample being pushed through the third pressure tap, past the at least one sensor and to the vent by the pressure created by the blower of the HVAC system, the at least one sensor configured to sense the same first air parameter of the third air sample before the third air sample exits through the vent;

a controller for causing the indoor air quality control module to alternate between sensing the first air parameter of the first air sample, sensing the first air parameter of the second air sample, and sensing the first air parameter of the third air sample and to output a measure that is related to a differential between the sensed first air parameter of the first air sample and the sensed first air parameter of the second air sample and/or a measure that is related to a differential between the sensed first air parameter of the first air sample and the sensed first air parameter of the third air sample to the zone controller to aid in controlling the supply airflow device, wherein the indoor air quality control module is a separate module from the HVAC controller and the corresponding zone controller.

19. The indoor air quality (IAQ) control module of claim 18, wherein the controller causes the indoor air quality control module to alternate between sensing the first air parameter of the first air sample, sensing the first air parameter of the second air sample, and sensing the first air parameter of the third air sample using a sensed pressure differential between the second air sample and the third air sample.

* * * * *